Nov. 21, 1961 B. F. WEINER 3,009,217
CLINICAL THERMOMETER RETAINER
Filed Feb. 28, 1958
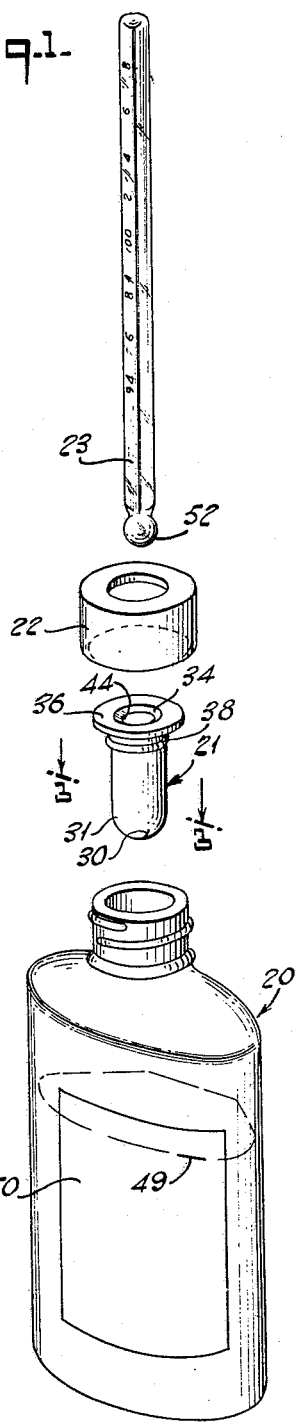
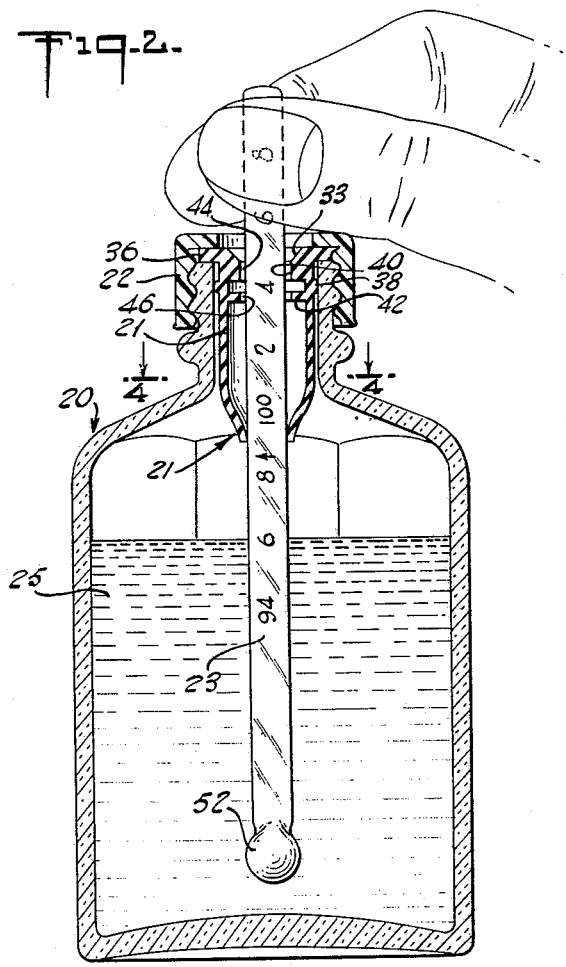
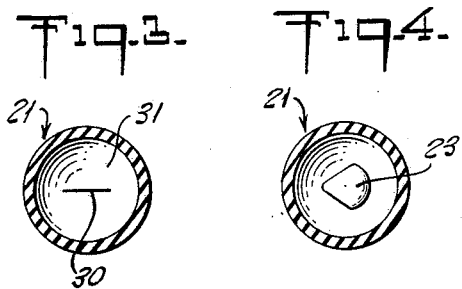
INVENTOR
BENJAMIN F. WEINER
BY
Mosely, Nolte, & Nolte
ATTORNEYS 3,009,217
CLINICAL THERMOMETER RETAINER
Benjamin F. Weiner, Bellmore, N.Y., assignor to Chase Bottle & Supply Corp., New York, N.Y., a corporation of New York
Filed Feb. 28, 1958, Ser. No. 718,228
10 Claims. (Cl. 21—82)

This invention relates in general to clinical thermometer apparatus and, more particularly, to a container of the self-closing type utilizing a retainer for supporting a clinical thermometer in an antiseptic bath when the thermometer is not in use.

It is an object of the present invention to provide a novel container for a clinical thermometer.

A further object is to provide a novel container of the self-closing type for a clinical thermometer, which container may be utilized to hold an antiseptic liquid.

Another object of the invention is the provision of a novel spill-proof container with a retainer employable as a holder for a clinical thermometer, with indicia on the container indicating a height to which the container is to be filled with an antiseptic liquid.

Other objects may become apparent from a perusal of the following specification considered in conjunction with the drawings, which are presented herewith for purposes of illustration of a preferred embodiment of the invention.

In the drawings:

FIG. 1 is an exploded view showing a container, a combination retainer and closure piece, and a container cap constructed in accordance with the invention, and with a clinical thermometer disposed thereabove prior to insertion in the container;

FIG. 2 is a transverse sectional view of the assembled container showing the clinical thermometer disposed within the container and having the lower end thereof spaced from the bottom of the container;

FIG. 3 is a sectional view taken along lines 3—3 in FIG. 1 and indicating the slit opening in the thermometer retainer and closure piece; and FIG. 4 is a sectional view taken substantially along lines 4—4 of FIG. 2.

Referring to the drawings there is shown a bottle or container 20 having a combination thermometer retainer and closure piece generally designated 21 disposed in the mouth of the container and held in place by a cylindrical cap 22. The cap 22 is opened at the container engaging end and has a hole therein at the opposite end to receive a clinical thermometer 23, to be inserted therethrough into an antiseptic bath 25 within the container. In order to insert the thermometer 23 into the bottle 25 it must be pressed through a slit 30 (FIG. 3) cut in an elongated tubular portion 31 of the retainer and closure piece 21.

The container 20 may be made of rigid material, such as glass, or a flexible material, such as plastic. The cap 22 has internal threads thereon which engage complementary threads on the external portion of the neck of the container 20.

The combination thermometer retainer and closure piece 21 is made of a resilient material, such as rubber, having a large top opening 33 with a gradually converging downwardly sloping top wall 34 to facilitate guiding of the thermometer into the container 20. The retainer and closure piece 21 is provided with an annular flange or lip 36 which is positioned on the top of the neck of the container. The lower portion of the retainer and closure piece comprises the elongated tube 31 having slit 30 cut or formed in the bottom.

The combination thermometer retainer and closure piece 21 is positioned in the neck of the container with the flange 36 resting on the top lip thereof and the elongated tube 31 extending well into the neck. The cap 22 is screwed onto the neck of the container 20 and effects an airtight seal between the top of the container and the cap.

An additional seal is formed between the interior of the retainer and the internal surface of the container neck by an external flange 38 formed on the retainer and closure piece 21. It will be noted that the plane of the upper surface of the external flange 38 is parallel to the plane of the lower surface of an upper internal annular flange 40. An additional lower internal annular flange 42 is provided on the retainer and closure piece 31 for thermometer guiding purposes and to aid in maintaining the desired configuration of the retainer and closure piece.

The flanges 40 and 42 aid in defining aligned openings, an upper one 44, and a lower one 46. The openings 44 and 46 are preferably shaped to permit the clinical thermometer 23 to be readily inserted therethrough. However, either or both of the openings 44 and 46 may be any predetermined shape, such as the cross-sectional shape of the thermometer as shown in FIG. 4, for example.

The length of the slit 31 may be any suitable dimension depending on the dimensions of the particular implement to be inserted through the slit and into the container. The slit 31 is made small enough to seal the container with the thermometer inserted. Since the retainer and closure piece 31 is resilient the material will stretch to effect a large opening at 30, and re-form to seal the opening upon removal of the thermometer.

The outside of the container 20 is provided with suitable indicia for indicating the preferred filling level for the antiseptic fluid. While the indicia may be placed on the bottle or container 20 in the form of a ridge, groove or other marking, the indicia may be such as a line 49 printed or otherwise placed on the label 50 secured by adhesive to the outer surface of the container 20. The legend "Fill-line" may be placed on the label or on the container, if desired.

From the foregoing it will be seen that the invention utilizes a retainer which has a slit therein normally closed when not in use, since the clinical thermometer retainer and closure piece 21, made of any suitable resilient material will snap closed when the clinical thermometer is removed. The upper and lower internal flanges are guide flanges for the clinical thermometer which are substantially axially aligned with the axis of the retainer closure piece 21 and the slit 30.

It will be noted that the lower tip 52 of the thermometer will necessarily be spaced from the bottom of the container when the thermometer is inserted by being gripped by the hand of the user, as shown in FIG. 2. This is true because the container and the thermometer height are chosen to make insertion to a lower position than indicated impossible, at least not without a second pushing movement with the fingers. Thus, if the thermometer is grasped at one end as indicated it will normally be inserted to the correct position.

Thus the invention provides an inexpensive container for storing a thermometer in an antiseptic germ-free container. The container is spill-proof regardless of whether the thermometer is inserted or not. Despite the fact that both the container and the thermometer may be made of fragile glass, there is very little probability of damaging either even with constant thermometer use and storage.

While a specific embodiment of the invention has been shown and described in detail to illustrate the application of the invention principles, it will be understood that the invention may be embodied otherwise without departing from such principles.

What is claimed as new and desired to be secured by Letters Patent of the United States is:

1. A clinical thermometer device for supporting a thermometer in an antiseptic comprising a container having a neck portion with an opening therein for receiving an antiseptic, a combination thermometer retainer and closure including an elongated thin walled tubular member having a resilient portion with a normally closed aperture disposed at the inner end of said container neck portion and an opposite end with an outwardly extending peripheral flange resting on the top shoulder of said container, the interior of said tubular member being unrestricted except for inwardly extending wall portions spaced in a direction toward the exterior of said container from the closed aperture and forming a guide and support for the outer end of the thermometer, and means for holding said thermometer retainer and closure in a predetermined position in the opening of the container.

2. A clinical thermometer device as set forth in claim 1, wherein the normally closed aperture in the resilient portion of the thermometer retainer and closure is a slit.

3. A clinical thermometer device as set forth in claim 1, wherein the normally closed aperture in the resilient portion of the thermometer retainer and closure is a slit and the means for holding the retainer in a predetermined position is a cap having an opening therein to receive the thermometer therethrough.

4. A clinical thermometer device as set forth in claim 1, wherein said tubular member includes at least one annular internal flange having an opening therein as a guide for axially aligning the thermometer within the retainer.

5. A device as set forth in claim 1, wherein the vertical dimension of the container is chosen to present an unobstructed internal path for the thermometer when grasped by the fingers of a person's hand adjacent the outer edge of the thermometer and inserted therein until the fingers contact the top of the container.

6. A device as se forth in claim 1, wherein said retainer is an elongated tubular unitary element of resilient material having a flanged outer end extending over the container opening and a portion of the top of said container.

7. A device of the kind set forth in claim 2, wherein said container carries indicia to indicate a fill line for the antiseptic.

8. A closure for supporting a rigid member in a container having an opening in a neck portion thereof, comprising a thin walled flexible tubular element having one end substantially closed except for a central slit opening defined therein for receiving an end of a rigid member to be supported within the container with the opposite end of said member extending outwardly from the tubular element, the opposite end of said tubular element being provided with an outwardly extending peripheral flange adapted to engage the end of the container neck opening, the interior of said tubular element being unrestricted except for inwardly extending wall portions spaced from the slit opening and forming a guide and support for the outer end of the rigid member.

9. A closure according to claim 8, wherein the end of said tubular element opposite the slit opening is beveled inwardly from the outer end to the inwardly extending wall portion.

10. A closure according to claim 8, including an annular sealing ring extending outwardly from the exterior wall of said tubular element intermediate the height thereof to provide sealing engagement with the interior walls of the container.

References Cited in the file of this patent

UNITED STATES PATENTS

| | | |
|---|---|---|
| 752,452 | Hohmann | Feb. 16, 1904 |
| 857,631 | Kennerly et al. | June 25, 1907 |
| 1,180,665 | McElroy | Apr. 25, 1916 |
| 1,299,339 | Hegner | Apr. 1, 1919 |
| 1,609,389 | Tomlinson | Dec. 7, 1926 |
| 2,153,981 | Heineman | Apr. 11, 1939 |
| 2,289,677 | Perelson | July 14, 1942 |
| 2,577,780 | Lockhart | Dec. 11, 1951 |
| 2,579,724 | Breakstone | Dec. 25, 1951 |
| 2,672,053 | Geyer | Mar. 16, 1954 |
| 2,724,274 | Rose | Nov. 22, 1955 |
| 2,896,827 | Stern | July 28, 1959 |